(12) United States Patent
Stolarczyk et al.

(10) Patent No.: US 7,336,079 B2
(45) Date of Patent: Feb. 26, 2008

(54) AERIAL ELECTRONIC DETECTION OF SURFACE AND UNDERGROUND THREATS

(76) Inventors: Larry G. Stolarczyk, 612 S. 7th St., Raton, NM (US) 87740; Tito Sanchez, 411 Colfax Ave., Raton, NM (US) 87740; John Myers, 209 Castlegate, Raton, NM (US) 87740; Chance Valentine, 274 Fairview, Raton, NM (US) 87740; Gerald L. Stolarczyk, 629 Pacos Ave., Raton, NM (US) 87740; Robert Troublefield, HCR 63 Box 319, Raton, NM (US) 87740; Igor Bausov, 313 S. 5th St., Raton, NM (US) 87740; Laxmi Narayana Botla, 301 S. 4th St. Unit 3, Raton, NM (US) 87740; Beaux Beard, 1453 State St., Raton, NM (US) 87740; Richard B. Main, P.O. Box AT, Los Altos, CA (US) 94023

( * ) Notice: Subject to any disclaimer, the term of this patent is extended or adjusted under 35 U.S.C. 154(b) by 0 days.

(21) Appl. No.: 11/405,602

(22) Filed: Apr. 17, 2006

(65) Prior Publication Data

US 2007/0035304 A1 Feb. 15, 2007

Related U.S. Application Data

(60) Provisional application No. 60/671,946, filed on Apr. 18, 2005.

(51) Int. Cl.
G01V 3/16 (2006.01)
(52) U.S. Cl. ............... 324/330; 324/337; 324/344; 324/329

(58) Field of Classification Search ......... 324/326–344
See application file for complete search history.

(56) References Cited

U.S. PATENT DOCUMENTS 4,577,153 A 3/1986 Stolarczyk (Continued)

OTHER PUBLICATIONS

Stolarczyk, L. G., Final Report, Delta Electromagnetic Gradiometer, Man-Portable: Stolar Research Corp.: Jan. 30, 2004.

(Continued)

Primary Examiner—Jay M Patidar
(74) Attorney, Agent, or Firm—Richard B. Main

(57) ABSTRACT

An aerial electronic system for detection of surface and underground threats comprises an electromagnetic (EM) gradiometer flown aloft over the possible ground and underground threats to a convoy. The EM gradiometer is disposed in a Styrofoam torpedo shaped pod that is towed in flight behind an airplane. An illumination transmitter and loop antenna mounted to the airplane radiate a primary EM wave that travels down to the ground surface and penetrates beneath. Frequencies of 80 KHz to 1 MHz are selected according to whether the targets are laying on the surface or deeply buried. Detonation wire pairs, buried cables and pipes, and other conductors will re-radiate a secondary wave that can be sensed by the EM gradiometer. A reference sample of the transmitter signal is carried down a fiberoptic from the airplane to the towed pod. This signal is used in the synchronous detection to measure the secondary EM wave phase.

8 Claims, 4 Drawing Sheets

U.S. PATENT DOCUMENTS

| | | | |
|---|---|---|---|
| 4,600,883 A * | 7/1986 | Egli et al. ............... | 324/207.26 |
| 4,691,166 A | 9/1987 | Stolarczyk | |
| RE32,563 E | 12/1987 | Stolarczyk | |
| 4,742,305 A | 5/1988 | Stolarczyk | |
| 4,753,484 A | 6/1988 | Stolarczyk | |
| 4,777,652 A | 10/1988 | Stolarczyk | |
| 4,879,755 A | 11/1989 | Stolarczyk | |
| RE33,458 E | 11/1990 | Stolarczyk | |
| 4,968,978 A | 11/1990 | Stolarczyk | |
| 4,994,747 A | 2/1991 | Stolarczyk | |
| 5,066,917 A | 11/1991 | Stolarczyk | |
| 5,072,172 A | 12/1991 | Stolarczyk | |
| 5,087,099 A | 2/1992 | Stolarczyk | |
| 5,093,929 A | 3/1992 | Stolarczyk | |
| 5,121,971 A | 6/1992 | Stolarczyk | |
| 5,146,611 A | 9/1992 | Stolarczyk | |
| 5,181,934 A | 1/1993 | Stolarczyk | |
| 5,188,426 A | 2/1993 | Stolarczyk | |
| 5,260,660 A | 11/1993 | Stolarczyk et al. | |
| 5,266,799 A * | 11/1993 | Steinitz et al. ............... | 250/253 |
| 5,268,683 A | 12/1993 | Stolarczyk et al. | |
| 5,301,082 A | 4/1994 | Stolarczyk et al. | |
| 5,408,182 A | 4/1995 | Stolarczyk et al. | |
| 5,474,261 A | 12/1995 | Stolarczyk et al. | |
| 5,686,841 A | 11/1997 | Stolarczyk et al. | |
| 5,769,503 A | 6/1998 | Stolarczyk et al. | |
| 6,473,025 B2 | 10/2002 | Stolarczyk et al. | |
| 6,497,457 B1 | 12/2002 | Stolarczyk et al. | |
| 6,501,414 B2 | 12/2002 | Arndt et al. | |
| 6,522,285 B2 | 2/2003 | Stolarczyk et al. | |
| 6,549,012 B2 | 4/2003 | Stolarczyk | |
| 6,593,746 B2 | 7/2003 | Stolarczyk | |
| 6,744,253 B2 | 6/2004 | Stolarczyk | |
| 6,778,127 B2 | 8/2004 | Stolarczyk et al. | |
| 6,892,815 B2 | 5/2005 | Stolarczyk et al. | |
| 6,927,698 B2 | 8/2005 | Stolarczyk et al. | |
| 6,993,302 B2 | 1/2006 | Bausov et al. | |

OTHER PUBLICATIONS

Stolarczyk, L. G., Final Report, Electromagnetic Gradiometer Survey System (EGSS) Survey at Delta Mine, Alaska: Stolar Research Corp.: Dec. 11, 2002.

Stolarczyk, L. G. "Detection of Underground Passages with and without Electrical Cable and Pipe with a Synchronized Electromagnetic Wave Gradiometer Instrumentation." 2002 Mee.

Stolarczyk, L. G., Final Report, Detection and Imaging of Underground Structures by Exploiting ELF/VLF Radiowaves: Raton Technology Research, Inc.: Jan. 14, 2000.

Stolarczyk, L. G. "Gradiometer Antennas for Detection of Tunnels by Scattered Electromagnetic waves." Fourth Tunnel Detection Symposium, Golden, CO 1993.

Stolarczyk, L. G. "Long Feature Tunnel Detection Methodologies using Phase Coherent Electromagnetic Instrumentation." Third Technical Symposium on Tunnel Detection Pro. 1988.

* cited by examiner

AERIAL ELECTRONIC DETECTION OF SURFACE AND UNDERGROUND THREATS

RELATED APPLICATIONS

This Application claims priority from U.S. Provisional Patent Application Ser. No. 60/671,946, by Larry G. STOLARCZYK, dated Apr. 18, 2005, and is incorporated herein by reference.

BACKGROUND OF THE INVENTION

1. Field of the Invention

The present invention relates to electronic detection of improvised explosive devices and underground threats, and more particularly to the use of airborne electromagnetic gradiometers that use synchronous detection to image detonation cables and underground facility wiring and piping.

2. Description of Related Art

Cellphones were being used to detonate roadside improvised explosive devices (IED's) in Iraq until the US Military countered with radio jamming equipment. Then the Insurgency resorted to stringing long detonation wire pairs that were not subject to radio jamming. This has proved to be difficult to counter. If the IED's or their triggers cannot be disabled as with jamming, then the next best strategy is to detect their deployment and neutralize them before the IED can injure a passing convoy.

Primary electromagnetic (EM) waves will interact with surface-laid wires and with the wiring and piping in underground infrastructures. Such re-radiate secondary EM waves that are detectable above with an EM gradiometer.

SUMMARY OF THE INVENTION

Briefly, an aerial electronic system for detection of surface and underground threats comprises an electromagnetic (EM) gradiometer flown aloft over the possible ground and underground threats to a convoy. The EM gradiometer is disposed in a Styrofoam torpedo shaped pod that is towed in flight behind an airplane. An illumination transmitter and loop antenna mounted to the airplane radiate a primary EM wave that travels down to the ground surface and penetrates beneath. Frequencies of 80KHz to 1 MHz are selected according to whether the targets are laying on the surface or deeply buried. Detonation wire pairs, buried cables and pipes, and other conductors will re-radiate a secondary wave that can be sensed by the EM gradiometer. A reference sample of the transmitter signal is carried down a fiberoptic from the airplane to the towed pod. This signal is used in the synchronous detection to measure the secondary EM wave phase.

An advantage of the present invention is that a system is provided to warn convoys of roadside threats ahead.

A further advantage of the present invention is a system is provided for detecting underground installations.

A still further advantage of the present invention is that a method is provided for sweeping a large area for suspicious wiring and buried installations.

The above and still further objects, features, and advantages of the present invention will become apparent upon consideration of the following detailed description of specific embodiments thereof, especially when taken in conjunction with the accompanying drawings.

DETAILED DESCRIPTION OF THE INVENTION

Figure 1:
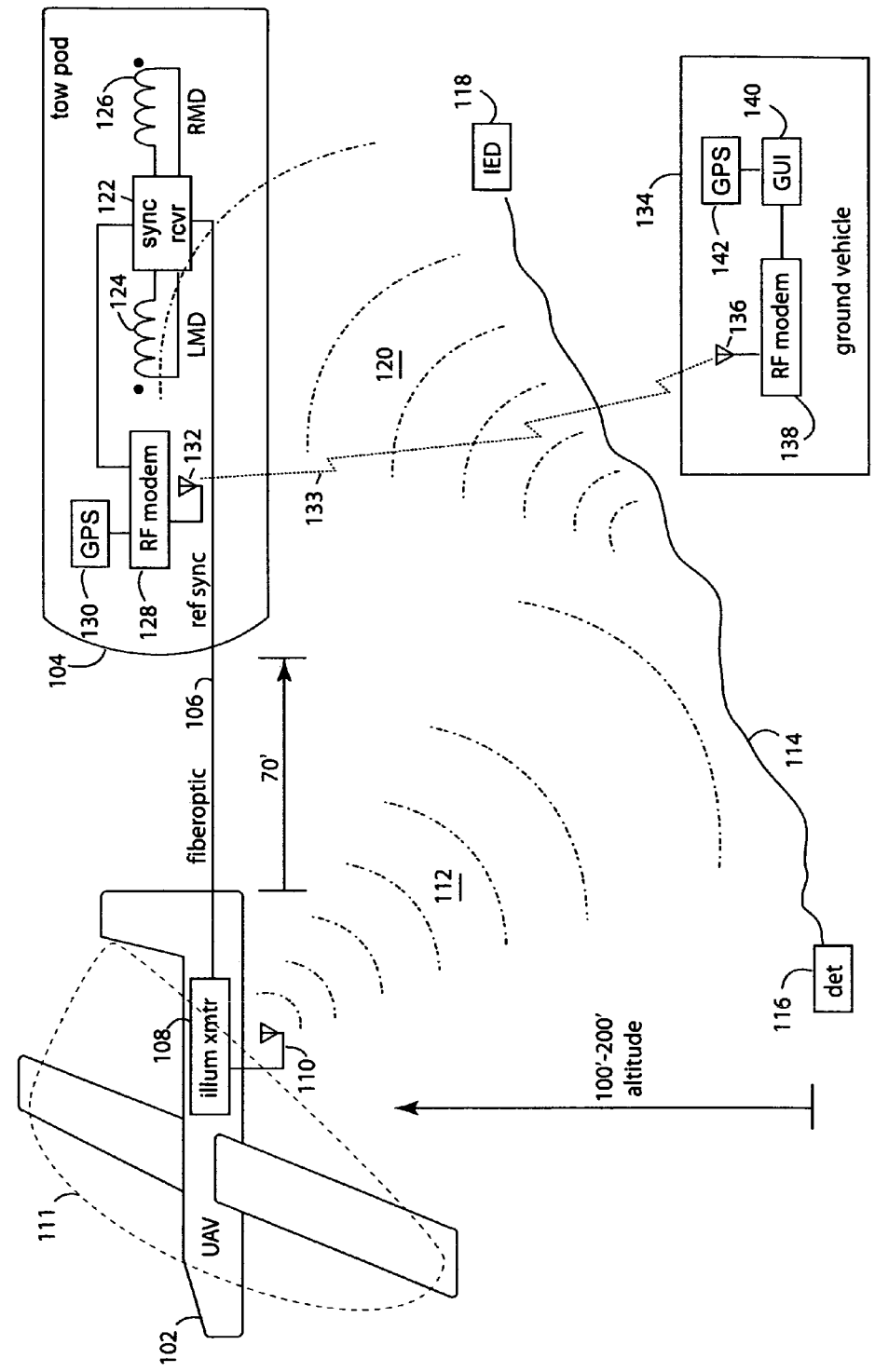
FIG. 1 is a functional block diagram of a system embodiment of the present invention for aerial electronic detection of surface and underground threats with an EM gradiometer.

FIG. 1 represents an aerial electronic system for detection of surface and underground threats, in an embodiment of the present invention that is referred to herein by the general reference numeral 100. System 100 comprises an unattended aerial vehicle (UAV) 102 that tows a pod 104 while airborne by a non-conductive tether including a fiberoptic cable 106. The pod 104, in one successful experiment, was the size of a small torpedo, had stabilizing wings at its tail to level its flight, and its round cylindrical fuselage was made of Styrofoam.

An illuminating transmitter 108 produces a tunable continuous wave (CW) signal of 80 KHz to 1 MHz that is directed down toward the ground surface by an antenna 110. For example, such antenna can be wound in a loop 111 and mounted to the nose, tail, and wingtips of UAV 102.

There may be some advantage to slewing or sweeping the CW transmissions through their frequency range to take advantage of the various kinds of reflections that have frequency sensitive signatures, or to image targets hiding behind or underneath something else. A primary EM wave 112 impinges on a detonation cable 114 that connects a detonator 116 to an improvised explosive device (IED) 118. Such IED 118 is typically laid along a convoy roadway by Insurgency forces in Iraq to be detonated when a valuable target rolls by.

Conductive objects like the detonation cable 114 will re-radiate a secondary EM wave 120. A synchronous receiver 122 uses a pair of oppositely wound ferrite-core magnetic dipole antennas, e.g., left magnetic dipole (LMD) 124 and a right magnetic dipole (RMD) 126 in a synchronous detection configuration. In one experiment, the antenna windings were collinearly and coaxially wound outside the 12" diameter Styrofoam torpedo body of tow pod 104 at the front and rear ends, respectively, about eight feet apart with twenty-five windings each.

A reference synchronizing signal from the illuminating transmitter 108 is supplied over the fiberoptic cable 106. Phase and amplitude measurements of secondary signal 120 are forwarded to an RF modem 128. A global positioning system (GPS) navigation receiver 130 provides position tags for the measurements. These are transmitted by a pod antenna 132 over a downlink 133, for example, to a lead command vehicle 134 in a convoy. An RF modem 136 demodulates and reconstructs the data for user display on a graphical user interface (GUI) 140. A GPS receiver 142 provides a present position of command vehicle 134, and that makes it possible to compute how far ahead is detonation wire 114 and IED 118. A variety of displays are used to plot and map possible IED threats for investigation.

Mounting the illumination transmitter 108 too near the receiver 122 can swamp the RF stages, so a stand-off distance is needed, e.g., seventy feet. In alternative embodiments of the present invention, the pod 104 can be suspended from or attached to a blimp or helicopter, and the illumination transmitter 108 can be dropped to the ground in a radio-buoy, or it can carried by a convoy vehicle.

The gradiometer ferrite-core magnetic dipole antennas LMD 124 and RMD 126 are electrically coupled and 180-degrees out of phase, e.g., the differential mode of operation. For maximum primary wave 112 cancellation, the antennas 124 and 126 are coaxial, the antenna rod axes along same axis, on a base line perpendicular to the intended target's trend. The magnetic dipole antennas may also be made switchable into the summation mode of operation. In the summation mode, the instrument operates as a single magnetic dipole, and not an EM gradiometer. The LMD and RMD antennas 124 and 126 may also be configured as vertical or horizontal magnetic dipoles. A synchronization and calibration antenna (SMD) may be included for tuning.

The system 100 can generate subsurface geophysical images with greater sensitivity, range, distance, and flexibility compared to conventional instrumentation. Prior art devices that try to capitalize preexisting radio sources for target illumination suffer from noise and weak signal levels.

System 100 depends on a synchronized EM gradiometer instrument with a narrow-band receiver 122 that can discriminate against spectra-noise components, and that operates in the low ionosphere, earth waveguide noise band. Such maximizes the detection threshold sensitivity of the instrumentation. The EM gradiometer technique capitalizes on a high threshold detection sensitivity to secondary EM waves 120 in the extremely low frequency (ELF) 30-300 Hz, and very low frequency (VLF) 3-30 kHz bands. Synchronization to the primary wave 112 with fiberoptic 106 enables very narrow-band detection with threshold detection sensitivity in the picoTesla (pT) range. Theoretical investigations have found that the secondary EM fields 120 are typically 20-60 dB below that of the directly received primary EM field 112. A difficult instrument design issue is how to detect the secondary fields in the presence of much larger primary field components. Careful implementation of the gradiometer antennas 124 and 126 can result in 70-dB of primary field suppression.

In a series of tests conducted with an airborne transmitter like that of FIG. 1, the coherent receiver was very sensitive to body dynamics during flight, the receiver phase data did not shift and was constant over the target, the transmitter output power had to be turned down and that limited illumination, and the estimated receiver altitude limit was around 100 feet. In further tests with a ground based transmitter, the non-coherent receiver had a good low-noise sensitivity floor, but the receiver phase data did not provide any information, and the transmitter showed up as accountable target in receiver data. The transmitter output power could be increased significantly to cover large areas, the transmitter could be stationary or mobile, and the receiver altitude ceiling was raised to 300+ feet by increasing the receiver gain. When either airborne or ground based transmitters were used, low receiver altitudes generated double-humped "m" data magnitude profiles, and the higher altitudes generated magnitude as single hump.

The source of the primary EM wave 112 can also be a vertical magnetic dipole, e.g., loop antenna, mounted on a lead vehicle in a convoy. Loop antennas generate omni-directional toroidal EM field components. Harrington developed a simple formula for the induced current (I) in long, thin electrical conductors when illuminated by the electric field component (E) of the EM-wave. (Time-Harmonic Electromagnetic Fields, McGraw-Hill, Inc. New York, 1961, pp. 233-234.) The primary electric field (EP) is in a horizontal plane, with a magnetic field (HP) component. When the primary electric field (EP) component illuminates the IED detonation wire pair 114, the induced current flow (I) in the detonation wire can be approximately determined from the long wavelength scattering limit, $$I = \frac{2\pi E_p}{\omega \mu \text{Log}(\kappa a)} \text{ amperes} \quad (1)$$

where, $\kappa = \beta - i\alpha$,
  $\beta$ is the phase constant;
  $\alpha$ is the attenuation rate;
  $\omega = 2\pi f$ and f is the operating frequency in Hertz;
  a=radius of the detonation wire pair; and
  $\mu = \mu_r \mu_o$ is the magnetic permeability.

Equation (1) shows that the induced current increases as the operating frequency is reduced. The induced current flow produces a cylindrically spreading secondary wave that is observable by a low-flying UAV. The secondary magnetic field component is given by, $$H_S = \frac{I}{2}\left(\frac{i\kappa}{2\pi r}\right)^{1/2} e^{-i\kappa r} \quad (2)$$

where, r=the radial distance in meters from the detonation wire to the UAV 102.

Figure 3:
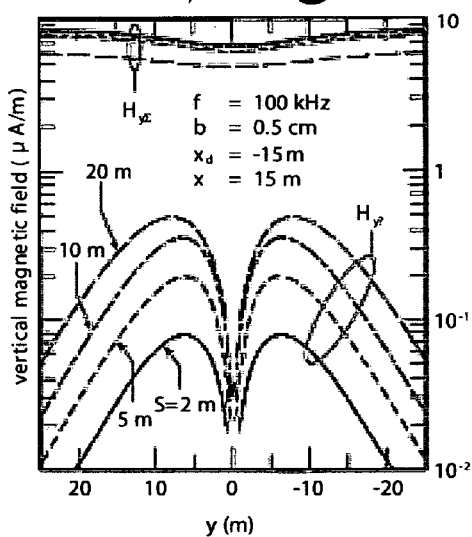
FIG. 3 is a graph of an ideal modeled EM gradiometer response.
Figure 4:
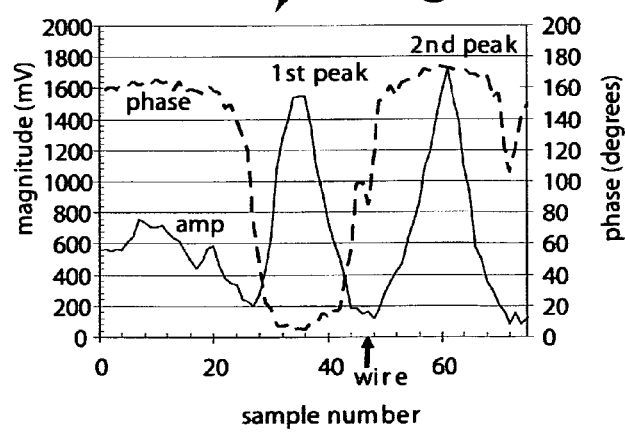
FIG. 4 is a graph of an actual EM gradiometer detonation wire pair detection response obtained during an experiment, where the IED detonation wire pair was 137', using a transmitter CW frequency of 200 KHz, a receiver gain of 14 dB, and a gradiometer antenna separation of eleven feet.

The secondary magnetic field component decays in magnitude by only the half power of distance (r) from the detonation wire 114. The upper curve in FIG. 3 shows the modeled sum of primary and secondary fields. The total field changes by only a few percent directly over the detonation wire and would be difficult to detect with conventional instrumentation. The lower set of gradient curves with the primary wave suppressed changes by a large amount, and is detectable with EM gradiometer instrumentation. The actual response of the hand held gradiometer is shown in FIG. 4 during a field test conducted by deploying a 137-foot detonation wire pair over the ground. The EM gradiometer was built by differentially connecting two identical ferrite rod antennas with a separation of approximately ten feet. Each of these antennas is a horizontal magnetic dipole. This configuration of antennas suppresses the primary magnetic field component by more than 70-dB.

in one experiment, the EM gradiometer was mounted inside the UAV and not towed behind in a pod. A number of sequenced passes over a range of speeds and heights was flown over IED detonation wire pairs of various lengths. The measured data was transmitted downlink to a companion receiver and notebook computer. An EM gradiometer electronics was mounted into a Rascal-type UAV. The electronics drew less than 400 mA, but to enable four hour operation, the demand current had to be reduced to a quarter ampere.

System 100 could be integrated with existing Ground Control and Tactical C4 Systems. The output from the gradiometer is transmitted to the ground base in real time, and still frame images are compressed and transmitted over PSC-5D in conjunction with EM gradiometer. Live video can be compressed and transmitted in real time over PRC-117F and PSC-5D links. The technology should be suitably hardened for use in theatre.

Figure 2:
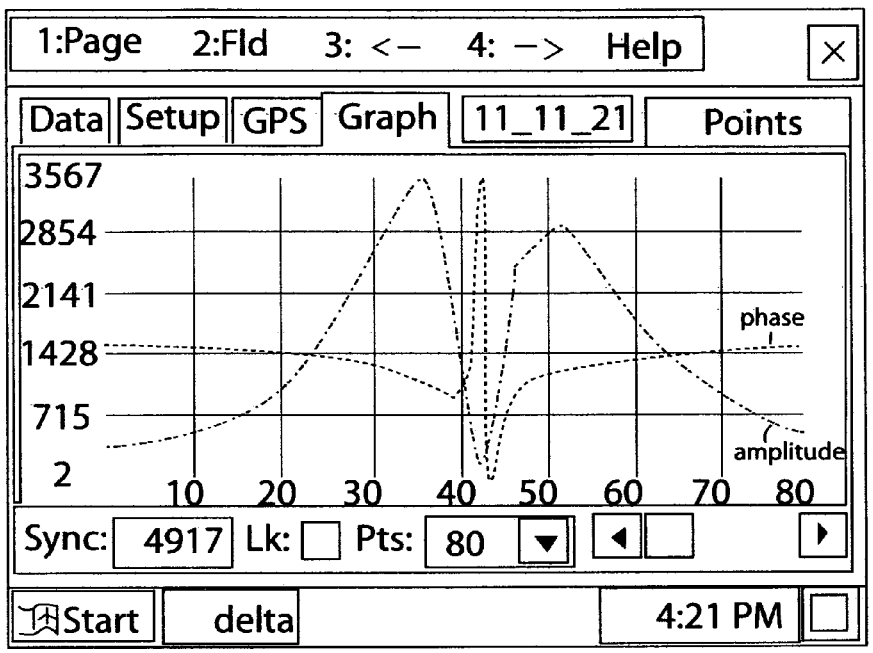
FIG. 2 is a diagram of a typical graphic user interface (GUI) displayed for a user in a lead convoy ground vehicle.

FIG. 2 represents a browser-type graphical user interface (GUI) 200 that would be useful in ground vehicle 134 in FIG. 1. A number of different tabs allow the selection of data, setup, GPS, and graph displays. Here, the phase and amplitude measurements from EMG receiver 122 are plotted according to range distance as provided by GPS 130 and GPS 142. FIG. 2 shows a detonation wire 114 is probable 42-meters out. A GPS display preferably shows the position of the ground vehicle on a map relative to the IED.

FIG. 3 models the ideal plot of amplitude for f=100 KHz.

FIG. 4 is a plot that was obtained in one experiment.

Figure 5:
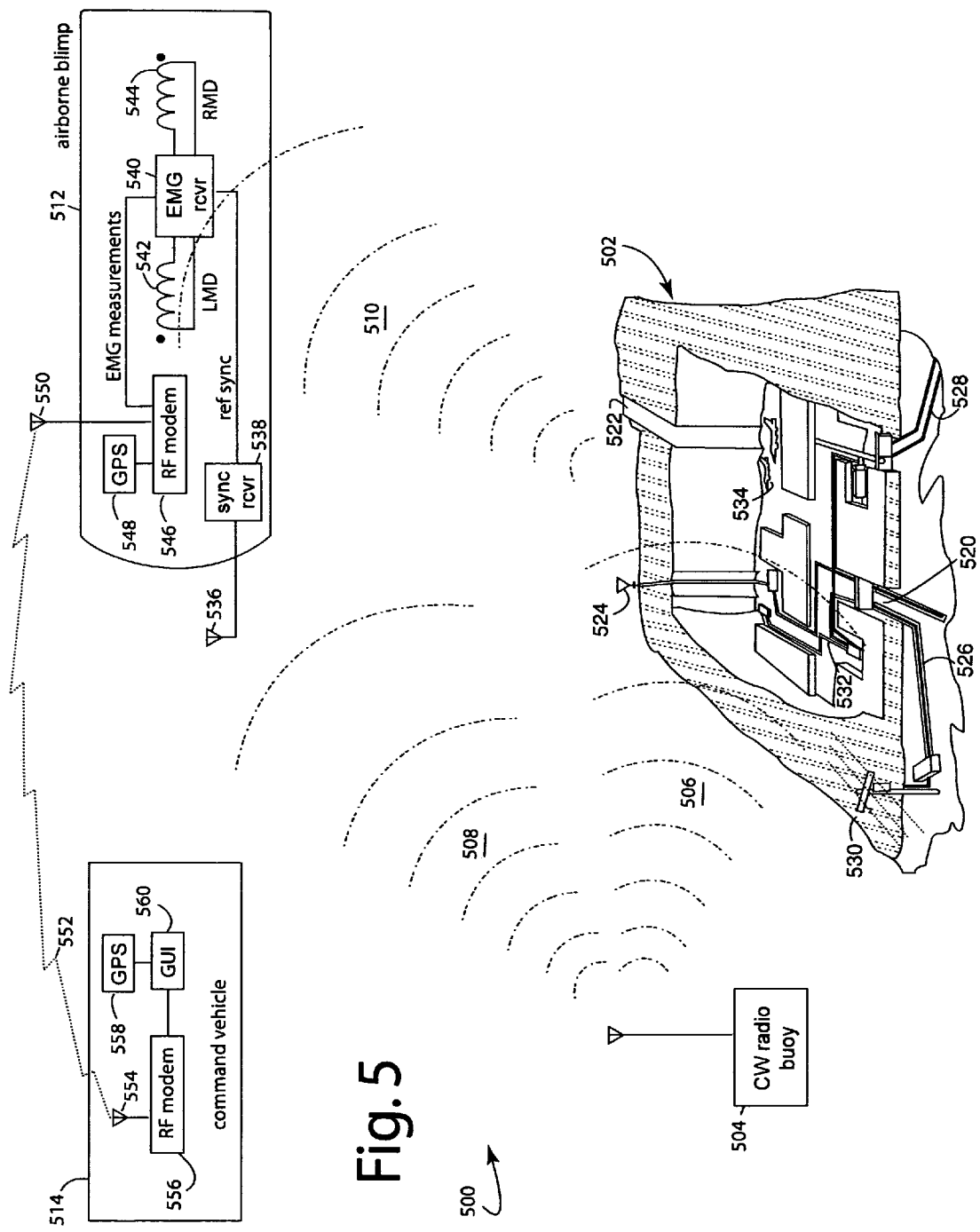
FIG. 5 is a functional block diagram of a system embodiment of the present invention for aerial electronic detection of surface and underground threats with an EM gradiometer held aloft by a blimp and using a radio buoy dropped to the surface.

FIG. 5 illustrates a system for detecting underground facilities and other threats electronically from airborne vehicles, and is referred to herein by the general reference numeral 500. System 500 can image an underground facility 502 by dropping a CW radio buoy 504 on the ground surface nearby. This will generate primary EM waves 506 and 508, typically tuned to around 80 KHz for maximum earth penetration. Various metallic objects in the underground facility 502 will reradiate secondary EM waves 510, the least attenuated of which will emerge straight above the reflecting object at the ground surface. A blimp 512 or helicopter hovering above uses EM gradiometer technique to take EM secondary wave 510 phase and amplitude measurements. These are reported together with the position of blimp 512 wirelessly to a command vehicle 514.

In hostile deployments, radio buoy 504 can remain silent until commanded to transmit, and then only transmit in predetermined timeslots and frequencies. Such would conserve battery power and help conceal its location.

The magnitude of the scattered secondary wave 510 detected from an underground conductor (UGC) infrastructure increases as the carrier frequency being used decreases. Extremely low frequency (ELF) 30-300 Hz, and very low frequency (VLF) 3-30 kHz wavebands have a significant advantage in UGC detection. The attenuation rate of EM waves in the ELF/VLF bands through soil and rock is very low, so deeply buried structures can be readily radio-illuminated and detected. The detected structures may even include empty passageways, or those with electrical conductors serving the utility and ventilation needs.

Underground tunnels and caves invariably provide electrical pathways. The electrical current flow (I) channel can be a source of the secondary EM field 510. Primary EM waves 506 induce current into electrical pathways. In an empty tunnel case, the higher conductivity layer underlying the tunnel will channel electrical current. Conductive layers underlying the tunnel can be created naturally by soluble salts. The result is a cylindrically spreading EM wave that is observable on the surface. In either case, an subsurface induced current results in a surface detectable secondary EM wave 510.

The exemplary underground facility 502 comprises an adit (entrance) 520, a ventilation shaft 522, an above-ground radio antenna 524, power-feed cables 526, train rails 528, outside utility transmission lines 530, internal power distribution cables 532, and vehicles 534. Many of these features are unavoidable, and very hard to conceal, especially from electronic scanning.

The blimp 512 includes a primary wave sample antenna 536 and a receiver 538. These obtain a synchronizing signal for an EM gradiometer (EMG) receiver 540. A coaxial left magnetic dipole (LMD) 542 and right magnetic dipole (RMD) 544 antennas are wound on a common core about ten feet from each other to receive secondary EM waves 510. EMG measurements are forwarded to an RF modem 546. A GPS receiver 548 provides position tags that are attached and transmitted on antenna 550 via a radio command link 552. A command vehicle antenna 554 connects to a matching RF modem 556. The EMG measurements and blimp positions are compared with vehicle position data from a command vehicle GPS 558 and displayed on a GUI 560. The user can then assess the threat ahead under the blimp 512 and take action to avoid being caught in an attack, or to direct a precision bombing raid.

There is a universal similarity amongst all kinds of underground facilities around the world. In part, this stems from the small number of academic institutions that educate and train the world's mining engineers, geologists, and geophysicists. The same curriculum and textbooks are subscribed to by most all the leading schools. Otherwise disperse members of the world mining community are also drawn together by trade associations and trade shows. For example, the 18$^{th}$ International Conference on Ground Control in Mining that was recently held at West Virginia University (WVU), and also the annual meetings of the Society of Mining Engineering allow for a lot of professional networking.

The technical specializations employed in the construction of underground facility 502 include mine design, ground control, ventilation, drainage, electrical design, conveyers, transport systems, geology, and geophysics. Governments have enforced standardization in mining practice through various health and safety regulations. Such regulations have their roots in basic lessons learned from mine disasters around the world. Some governments go so far as to encourage their domestic equipment manufacturers to export machinery for the worldwide mining market. Indeed, mining machines that are proven to be reliable in their domestic markets will find ready export markets. These factors result in underground facility construction that is consistent in all countries.

Many different kinds of underground structures use reinforced concrete, and the steel reinforcing is very easy to image electronically with ground penetrating radar. Drug smuggling tunnels in the Nogales, Ariz., area would collapse if it were not for its aggressive ground control measures. Structures developed into hard rock have similar ground control requirements. Weathering at the adits can make the ground incompetent. Aggressive use of steel/wood supports along with metal screening is required, and reinforced concrete is commonly used in the construction of adits. As the entries are developed, ground control measures intensify with strata depth and with the width of the entry. Mines driven into schists use roof bolts and metal screening to cross through faults. Roof rock falls can be detected seismically with geophones. Such microseismic devices can be integrated into an EM-gradiometer for long-term monitoring.

The preferential use of pneumatic drills in mines means that a network of high pressure metal pipes must be installed to supply the compressed air. Such pipe network will reradiate electromagnetic waves as well as power cables and railroad rails. The drills and the blasting with explosives in mines also means seismic and sound detectors can be used to detect activity, especially new construction.

The tunnel boring machines (TBM) used by such operations are specialized equipment that can be tracked by commerce officials. The sale and delivery of TBM's can signal that a new search could turn up underground facility 502 and provide some preliminary information on where to look.

A shallow-buried tunnel was recently detected by the odd way snow melted overhead on the surface along the center line of the tunnel. Such tunnel used wood-support ground-control measures to build the tunnel. Other nearby tunnels were driven into schist with drill-and-blast methods. Evidence suggested that rail was used for muck transport. Lighting brackets were seen on the ribs (walls) of the tunnel, and their electrical conductors were EM-observables on the surface.

Mining engineers expect water will most likely be encountered in developing entries, and so mines are developed upgrade to naturally dewater the workings. The mine drainage water therefore exits underground facility 502 at an adit. In sulfide-bearing rock mass, the drainage water will be acidic, and discolor the surface soil and retard vegetation. Such water may form an electrical conductor.

Bacteria of two types always seem to be associated with mine ventilation. When sufficient oxygen is present, the relatively warm and moist underground environment fosters rapid accumulation of aerobic bacteria strains. But in the poorly or not ventilated areas, carbon dioxide (black damp) builds up, and anaerobic bacteria grows rapidly. Septic conditions can also generate hydrogen sulfide and methane.

Mine ventilation engineers try to drive fresh air through the mine's entries and into the working areas with a "primary fan" that is located as near the adit as possible, e.g., in an air door. Overpressure is typically generated by the primary fan in the mining complex to push air out the exhaust vents at the deep end of the complex. Sometimes air ducts are used to carry fresh air to the working area, and the used air exits at the adit. The ventilation system may also be designed around an exhaust fan system. Some ventilation tubing includes electrically conductive spiral wire that can reradiate signals that are observable on the surface with EM-detectors.

Large underground mines and other facilities have trouble maintaining adequate air ventilation, so lots of small fans will usually be found to assist the main fans. Three-phase electric utility power is generally required for big ventilation fans because of the large horsepower electric motors they use. The smaller fans are usually connected to single-phase power.

In remote areas, diesel and propane gensets are used because bringing in a utility transmission line 112 is not practical. The power cables depended on to supply the fans can be expected to radiate secondary EM-waves 510 and also waveguide the primary EM-waves 506 deeper into the lower parts of the underground facility 502.

The electrical power and telephone design practice is dictated by universal health and safety regulations, and differ for gassy and non-gassy mines. In non-gassy mines, electrical transformers and switches are designed to surface standards. However, in gassy mines, flameproof enclosures are designed around these electrical apparatus.

In Third World countries, three-phase power wires entering the complex are distributed in three separate conductors that run in parallel along the rib (side) of the drift. This is because jacketed three-phase cables as used in the US and Europe are too expensive and too difficult to get. Such wiring promotes low-attenuation rate monofilar and bifilar EM-wave propagation in the mine. Since these conductors traverse most of the mine entries, any induced radio signal current flow results in secondary waves that can be used to determine the orientation of entries in the underground facility 502.

Proper electrical grounding in underground facility 502 is exceedingly important, but it is difficult to maintain a single continuous grounding conductor throughout any mine. When a grounding wire is damaged or fails, the safety circuit breakers may not trip if a motor fault occurs. So each load has its own ground wire run to it, and these ground wires fan out throughout the mine.

Mining machines induce unique current flows in these ground wires, and the signal radiates as an EM-observable. For example, induction motors during startup cause a triangular-shaped ground current to flow. A Fourier series representation of induced current includes odd harmonics that decay as the inverse square of the odd harmonic number, e.g., albeit an electronic signature. There is also a strong component at the induction motor slip frequency. By monitoring the slip frequency, motor loading can be determined. Three-phase rectifiers also generate strong harmonics that decay as the inverse first power of the harmonic number. In general, the mine-generated electrical noise density spectrum below 100 KHz increases as the inverse power of frequency. An EM-gradiometer can be set advantageously to search for such power system-induced harmonics.

For a thin electrical conductor in a tunnel, equation (1) teaches that the induced current increases with the amplitude of primary EM-wave electric field component that is tangential to the electrical conductor and inversely with frequency ($\omega$). Therefore, lower frequency EM-waves are preferable and compatible with the HAARP transmitter electrojet modulation capability and other standoff opportunistic sources that utilize the earth-ionosphere waveguide. Actual measurements conducted at the Colorado School of Mines (CSM) BRDEC tunnel proved that induced current given Equation (1) increased as frequency decreased. For a magnetic dipole source, the longitudinal electric field component is given by $$E_\phi = \frac{i\mu\omega M k^2}{4\pi}\left[\frac{-1}{(kr)^2} + \frac{1}{i(kr)}\right]e^{-ikr}\sin\phi \quad (3)$$

where, M=NIA is the magnetic moment (turn peak ampere square meters), and $\phi$ is azimuth angle in degrees.

Because of the $\omega$ term in the above equation, the electric field vanishes at zero frequency. There is an optimum frequency for inducing maximum current for magnetic dipole sources. Primary EM-waves that propagate in earth-ionosphere waveguide signals are quasi-transverse EM-waves (TEM) which produce uniform illumination of the underground facility 502. In the case of a waveguide TEM-wave, the magnitude of electric field is not frequency dependent as in the case of the magnetic dipole source.

Harrington goes on in his formulation to show that the secondary EM-wave scattered from the electrical conductor will slow decay with distance from the conductor at radial distances that are large compared with the skin depth. M. L. Burrows also develops similar formulations as, $$H_s = \frac{il_s k}{4} H_1^{(2)}(kr). \quad (4)$$

and $$E_s = -Z\frac{\omega\mu I}{4} H_0^{(2)}(kr) \quad (5)$$

where φ, Z are unit vectors, $H_0^{(2)}$, $H_1^{(2)}$ are Hankel functions of the second kind (order 0 and 1), and r is the radial distance in meters to the measurement point. (*ELF Communications Antennas*, Peter Peregrins Ltd., Southgate House Stevenage, England, 1978.)

At radial distances that are large compared with the skin depth, the asymptotic formula of the Hankel function leads to simplified expressions, $$Hs \approx \Phi\frac{I_s}{2}\left(\frac{ik}{2\pi r}\right)^{\frac{1}{2}} e^{-ikr} \quad (5)$$

and $$Es \approx -Z\frac{\omega\mu Is}{4}\left(\frac{i}{2\pi kr}\right)^{\frac{1}{2}} e^{-ikr}. \quad (6)$$

The secondary cylindrically spreading EM-waves decay with the half power of distance (r) from the conductor. They are decreased in magnitude by the attenuation factor $e^{-\alpha r}$ A gradiometer antenna is designed to measure the gradient of the cylindrical spreading EM-wave. The reception of secondary EM-waves in the rock mass surrounding the tunnel or on the surface confirms the existence of nearby electrical conductors.

David Hill reformulated the problem for the case of finite length conductors and non-uniform illumination by a magnetic dipole source. ("Near field and Far field Excitation of a Long Conductor in a Lossy Medium", report NISTIR-3954, National Institute of Standards and Technology, Boulder, Colo., 1990.) In this case, standing waves occur on the underground conductors. In a passageway with multiple conductors, the standing wave pattern is not observable because of multiple reflections in the ensemble of electrical conductors.

Bartel and Cress used forward modeling codes developed by Gregory Newman to show that current flow is induced in reinforced concrete. ("An Electromagnetic Induction Method for Underground Target Detection and Characterization", Sandia Report SAND97-0054, January 1997.) Forward modeling codes are now available to determine underground facility 502 response for EM sources above and below the earth's surface.

Wait and Hill have theoretically shown that the passageway conductors form low attenuation rate transmission networks (waveguides) for distribution of induced current throughout the underground facility 502. ("Excitation of Monofilar and Bifilar modes on a Transmission Line in a Circular Tunnel", J. Applied Physics, vol. 45, pp. 3402-4356, 1974.)

The attenuation rate is typically less than 1.0 dB per kilometer at 50 KHz. The passageway conductors essentially create an induced current distribution network throughout the underground facility 502. The current appears on the electric power and telephone cables entering the complex through any adits. Switches will not disrupt all the induced current flow because the grounding conductors are never switched. However, open switches and any isolation transformers can attenuate the signal.

The total field is the sum of the primary and secondary field. Usually the total field changes by only a few percent, but the gradient changes by tens of percent when an EM-gradiometer is passed over a conductor. If quasi-TEM earth-ionosphere waveguide signals are used, EM-waves couple across the air-soil boundary and propagate downward. The attenuation rate (α) and phase shift (β) for a uniform plane wave propagate in natural medium with a typical relative dielectric constant of ten. The propagation constant can be estimated for various types of natural media.

The electrical conductivity of most natural media increases with frequency. The lower frequency signal attenuation rate decreases from high frequency values, so deeper targets may be detected using lower frequencies. Ground-penetrating radar technologies are inappropriate to find underground facility 502, at one hundred MHz in a 10-1 S/m media, the attenuation rate is too great. It's about 39-dB per meter, and such prevents receiving minimum signals at surface.

One advantage of an EM-gradiometer is that it can be used on the surface. Radiowave interference from distant sources will be plane waves that can be easily suppressed by the gradiometer antenna. The gradiometer measurements of tunnel and underground facility 502 response typically exhibit a high signal-to-noise (signal-to-noise) ratio which is favorable for reducing the false alarm rate (FAR).

David Middleton describes signal detection processes that are optimum in the sense of maximizing receiver threshold detection sensitivity. (Introduction to Statistical Communication Theory, Peninsula Publishing, Los Altos, Calif. 1987.) For a sinusoidal signal embedded in white electrical noise, synchronous detection maximizes the threshold detection sensitivity. The receiver detection sensitivity is given by, $$S_T^{10} = -164 + 10 \log_{10} BW + 10 \log_{10} NF \text{ dBM} \quad (7)$$

where BW is the noise bandwidth of the receiver in Hertz, and NF is the noise figure of the receiver.

The received signal $S_T^{10}$ produces a 10 dB signal-to-noise ratio in the receiver signal path. The first right-hand term (−164 dBM) represents a signal of 3.1 nanovolts that produces a signal-to-noise ratio of 10 dB in the receiver signal path. The far right-hand term represents the threshold detection sensitivity degradation due to receiver noise figure. Typically, a well-designed receiver will exhibit a noise figure near 2-dB. The middle term reveals that the noise bandwidth (BN) is the predominating factor in the receiver design problem.

The receiver threshold sensitivity increases as bandwidth is reduced. By synchronizing the receiver to the EM-wave illuminating the target, the receiver bandwidth can be made very small. Alternatively, a wider bandwidth can be used in the design where sampling and averaging can be used to achieve effective bandwidth. However, this type of system would not be able to discriminate the discrete spectrum.

An EM-wave magnetic field component threading an area of an induction coil of N-turns produces an electromotive force voltage (EMF) that is, $$\text{emf} = -N\frac{d\phi}{dt} \tag{8}$$

where, $\phi=BA$ is the magnetic flux in Webers and B is the magnetic flux density in Tesla (Weber per square meter). "A" is the effective area of the magnetic dipole antenna in square meters.

For a sinusoidal magnetic flux, the EMF voltage induced in an antenna is, $$emf=iN\omega(\mu_r A)B \tag{9}$$

where, N is the number of turns of the electrical conductor used in building the induction coil on the ferrite rod and $\mu_r$ is the relative permeability of the ferrite rod antenna.

A ferrite rod with an initial permeability of 5,000 and a length/diameter ratio of twelve achieves a relative permeability of one hundred twenty. The induced EMF increases with the first power of N and operating frequency ω, therefore, HAARP modulation frequency should be as high as possible to take advantage of ω in equation (9), but still low enough for the illuminating primary wave to encounter a low attenuation rate. The voltage also increases with the first power of effective area ($\mu_r A$) and magnetic flux density (β) of the illuminating EM-wave.

For a one inch diameter ferrite rod, the area is, $$A=\pi(0.0127)^2=5.07\times10^{-4} \text{ square meter.} \tag{10}$$

A picoTesla ($10^{-12}$ Webers per square meter) signal in the ferrite rod induction coil will produce a signal, $$emf=-i(850)(2\pi\times10^4)([120]5.07\times10^4)(10^{-12})=i32 \text{ μV per picoTesla.} \tag{11}$$

Noise is expected to be 0.02 picoTesla in a 1-Hertz bandwidth. The signal-to-noise ratio is, $$SNR = \frac{32\times10^{-12}}{.02\times32\times20^{-12}} = 50. \tag{12}$$

The primary EM-wave illuminating the ground surface may alternatively be received by a series tuned sync magnetic dipole antenna (SMD). An EMF signal of typically 32 μV per picoTesla will be amplified by a programmable gain controlled amplifier (PGA), e.g., 60 dB of gain. A mixer-filter frequency transposes the signal into a 2.5 KHz intermediate frequency (IF) signal, and provides an additional gain of 78-dB. The IF signal is filtered and limited to form a square wave. The square wave signal is applied to the phase-locked loop (PLL) phase detector (PD). The PD and voltage controlled oscillator (VCO) 310 produces the in-phase (I) and quadrature (Q) sampling gate signals.

The differential mode radiometer antenna, left magnetic dipole and right magnetic dipole, array produce an output signal ($e_o$), $$e_o=emf_1-emf_2. \tag{13}$$

The EM-gradiometer array signal ($e_o$) is amplified by programmable gain control amplifier (PGA). The mixer-filter circuit results in the frequency transportation of the gradiometer signal to the 2.5 KHz intermediate frequency (IF) signal. The IF gradiometer signal is applied to the in-phase (I) and quadrature (Q) sampling gates.

The I and Q gate output signals are applied to separate integrators. The output of each integrator is applied to an analog-to-digital converter (ADC). After integration, the rectified signals are represented by $$e_I=Ae_o\sin\theta \tag{14}$$

and $$e_Q=Ae_o\cos\theta \tag{15}$$

where, $Ae_o$ is the magnitude of the amplified gradiometer signal and A is the total signal path gain, and θ is the phase of the gradiometer array signal and the signal path phase shift. The output is processed by a microcomputer.

The squared magnitude of these signals is, $$M=\sqrt{e_I^2+e_Q^2}=Ae_o \tag{16}$$

and the phase by $$\theta=\tan^{-1}e_I/e_Q \tag{17}$$

The three EM-wave field components of a quasi TEM-wave are a vertical electric field, a horizontal magnetic field component, and a horizontal electric field component. The horizontal electric and magnetic field components couple across the air-earth surface boundary, then propagate downward to illuminate underground facility 502. Measurement of the horizontal "E" and "H" components is used in determining the electrical conductivity of the soil overlying the underground facility 502. An indigenous transmitter can represent an opportunistic source of quasi TEM signals, e.g., the Navy very-low-frequency transmitter, located in Washington state with an output power of $2.3\times10^5$ watts. The quasi TEM-wave vertical electric field has been analytically determined to be 2.2 mV/m at the NTS. The experimental value was found to be 2.6 mV/m.

Aircraft equipped with horizontal magnetic dipole antennas are conventionally used in geophysical exploration. Very strong EM signals can be created by induction coils designed into chemical explosives, magnetohydrodynamic devices (MHDD). An MHDD was developed into a borehole radar logging tool for the oil/gas industry, but the industry did not adopt their use because of the explosive damage possible to the very costly-to-drill wells. But an MHDD detonated over a underground facility 502 just prior to and during sampling could be an effective radio illumination source.

The synchronized EM-gradiometer receiver technology can be reconfigured into a ground-penetrating transponder (GPT) for remote sensing. underground facility 502 response data could then be collected prior to a scout-team visit. The GPT preferably includes an S-band transmitter for transmitting data collected to standoff receivers. A number of GPT's may be placed along a survey line preferably crossing the heading of a adit and the underground facility 502, and form a gradiometer array. Each GPT preferably further includes a seismic monitor, e.g., implemented with micro-electro-mechanical system (MEMS) technology. The seismic data collected can help to estimate the depth of underground roadways, and to map the orientation of entries in the underground facility 502. Position information can be provided by a global positioning system (GPS) receiver.

Not all target conductors will be transverse to the longitudinal axis of a single-axis EM gradiometer. It can therefore be advantageous to configure an X-array to gather two dimensional information.

Figure 6:
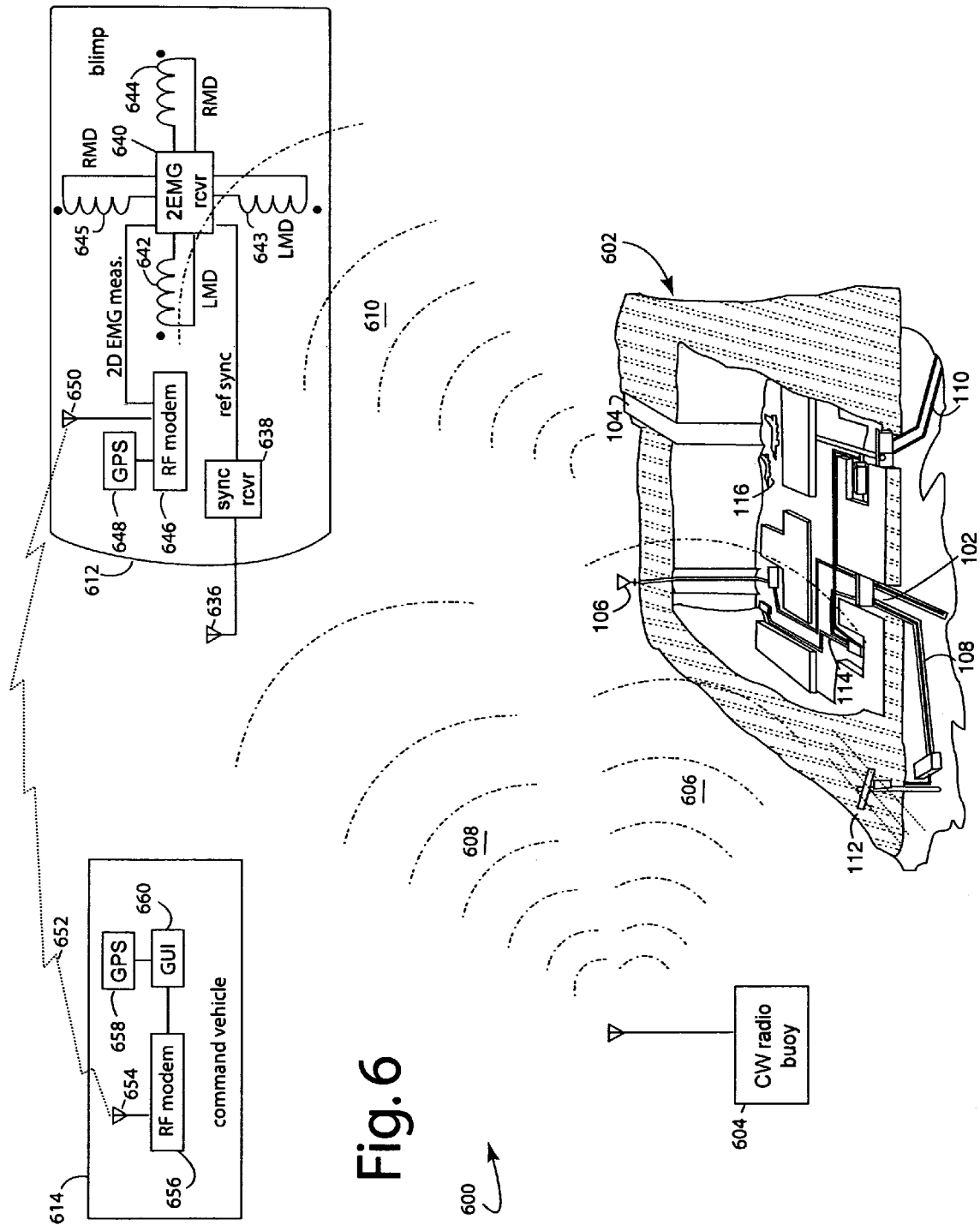
FIG. 6 is a functional block diagram of a two-axis system embodiment of the present invention for aerial electronic detection of surface and underground threats with a two-axis EM gradiometer held aloft by a blimp and using a radio buoy dropped to the surface.

FIG. 6 illustrates a system for detecting underground facilities and other threats electronically from airborne vehicles in two axes, along track and cross-track, and is referred to herein by the general reference numeral 600. System 600 is similar to system 500 (FIG. 5) in that it can image an underground facility 602 by dropping a CW radio buoy 604 on the ground surface nearby. This will generate primary EM waves 606 and 608, typically tuned to around 80 KHz for maximum earth penetration. Various metallic objects in the underground facility 602 will reradiate secondary EM waves 610 as dipoles which polarize according to their orientation in the horizontal plane. A blimp 612 or helicopter hovering above uses a two-axis EM gradiometer technique to take EM secondary wave 610 phase and amplitude measurements with orthogonally arranged antennas. These measurements are reported together with the position of blimp 612 by secure radio to a command vehicle 614.

The exemplary underground facility 602 comprises an adit entrance 620, a ventilation shaft 622, an above-ground radio antenna 624, power-feed cables 626, train rails 628, outside utility transmission lines 630, internal power distribution cables 632, and vehicles 634. Many of these features are unavoidable, and very hard to conceal, especially from electronic scanning.

The blimp 612 includes a primary wave sample antenna 636 and a receiver 638. These obtain a synchronizing signal for a 2-axis EM gradiometer (2EMG) receiver 640. A coaxial left magnetic dipole (LMD) 642 and right magnetic dipole (RMD) 643 antennas are wound on a common core about ten feet from each other to receive secondary EM waves 610 in one along-track axis. A coaxial left magnetic dipole (LMD) 644 and right magnetic dipole (RMD) 645 antennas are wound on another common core about ten feet from each other to receive secondary EM waves 610 in one cross-track axis. The antennas 642-645 are in a cross dipole array set perpendicular to each other and in one horizontal plane parallel to the ground surface below.

2D-EMG measurements are forwarded to an RF modem 646. A GPS receiver 648 provides position and heading tags that are attached and transmitted on antenna 650 via a radio command link 652. A command vehicle antenna 654 connects to a matching RF modem 656. The 2D-EMG measurements and blimp positions are compared with vehicle position and heading data from a command vehicle GPS 658 and displayed on a GUI 660. The user can then assess the threat ahead under the blimp 612 and take action to avoid being caught in an attack, or to direct a precision bombing raid.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. An airborne system for electronic detection of surface and underground threats, comprising:
   a primary electromagnetic (EM) wave radiator for radio illuminating a local area;
   an EM gradiometer for detecting secondary EM waves from objects illuminated by a primary EM wave;
   means for providing a synchronizing reference signal from the primary EM wave radiator to the EM gradiometer for synchronous detection with right and left magnetic dipole antennas;
   an airborne vehicle for lifting the EM gradiometer aloft over said local area during periods said objects are radio illuminated; and
   a graphical user interface (GUI) for processing phase and amplitude measurements of said secondary EM waves, and for displaying information about the location of threat objects illuminated by said primary EM wave in said local area passing underneath the airborne vehicle.

2. The system of claim 1, wherein:
   the primary EM wave radiator is not carried by the same airborne vehicle to prevent saturating the EM gradiometer with said primary EM waves.

3. The system of claim 1, further comprising:
   a tow pod in which the EM gradiometer is mounted and for being towed in flight behind an airplane;
   a tether for connecting the tow pod to said airplane, and including a fiberoptic cable as a means for providing a synchronizing reference signal; and
   a loop antenna for mounting to said airplane and providing for the primary EM wave radiator.

4. The system of claim 1, further comprising:
   a radio buoy providing for the primary EM wave radiator, and which can be dropped to the surface of said local area.

5. The system of claim 4, further comprising:
   a transmission control means for generating said primary EM wave only during requested or scheduled time slots.

6. The system of claim 1, further comprising:
   at least one of a blimp or helicopter providing for the airborne vehicle and that can hover and linger over said local area.

7. A dual-axis EM gradiometer, comprising:
   a first pair of left and right magnetic dipole antennas coaxial to one another and wound on opposite ends of a common cylindrical core;
   a second pair of left and right magnetic dipole antennas coaxial to one another and wound on opposite ends of a common cylindrical core, and set orthogonal to and in a horizontal parallel plane with the first pair of left and right magnetic dipole antennas;
   a synchronous receiver for recovering phase and amplitude information for secondary EM wave signals recovered by the first and second pairs of left and right magnetic dipole antennas, and using synchronous detection to produce corresponding phase and amplitude measurements; and
   a navigation receiver for producing position tags that can identify the locations of objects radiating said secondary EM wave signals.

8. An airborne system for electronic detection of surface and underground threats, comprising:
   a primary electromagnetic (EM) wave radiator for radio illuminating a local area;
   a first pair of left and right magnetic dipole antennas coaxial to one another and wound on opposite ends of a common cylindrical core;
   a second pair of left and right magnetic dipole antennas coaxial to one another and wound on opposite ends of a common cylindrical core, and set orthogonal to and in a horizontal parallel plane with the first pair of left and right magnetic dipole antennas;

a synchronous receiver for recovering phase and amplitude information for secondary EM wave signals recovered by the first and second pairs of left and right magnetic dipole antennas, and using synchronous detection to produce corresponding phase and amplitude measurements; and a navigation receiver for producing position tags that can identify the locations of objects radiating said secondary EM wave signals;

means for providing a synchronizing reference signal from the primary EM wave radiator to the synchronous receiver;

an airborne vehicle for lifting the first and second pairs of left and right magnetic dipole antennas aloft over said local area during periods said objects are radio illuminated; and a graphical user interface (GUI) for processing phase and amplitude measurements of said secondary EM waves, and for displaying information about the location of threat objects illuminated by said primary EM wave in said local area passing underneath the airborne vehicle.

* * * * *